United States Patent [19]

Mochizuki

[11] Patent Number: 5,781,314
[45] Date of Patent: Jul. 14, 1998

[54] COLOR IMAGE READING APPARATUS AND METHOD

[75] Inventor: Masahiro Mochizuki, Kanagawa-ken, Japan

[73] Assignee: Nikon Corporation, Tokyo, Japan

[21] Appl. No.: 662,260

[22] Filed: Jun. 14, 1996

[30] Foreign Application Priority Data

Jun. 15, 1995 [JP] Japan ................................. 7-148452

[51] Int. Cl.⁶ .......................... H04N 1/40; H04N 1/04; H04N 1/46
[52] U.S. Cl. .................... 358/509; 358/443; 358/446; 358/448; 358/474; 358/496; 358/512; 358/515; 358/518
[58] Field of Search .......................... 358/509, 512, 358/515, 513, 518, 521, 522, 529, 446, 496, 443, 448, 474, 494; 348/223, 266, 229

[56] References Cited

U.S. PATENT DOCUMENTS

| | | | |
|---|---|---|---|
| 3,922,714 | 11/1975 | Delavie | 359/509 |
| 4,136,360 | 1/1979 | Hoffrichter et al. | 358/509 |
| 4,893,180 | 1/1990 | Shigaki et al. | 358/509 |
| 4,942,462 | 7/1990 | Shiota | 358/509 |
| 4,942,727 | 7/1990 | Imaide et al. | 358/509 |
| 4,959,727 | 9/1990 | Imaide et al. | 358/518 |
| 5,191,406 | 3/1993 | Brandestini et al. | |
| 5,424,537 | 6/1995 | Lehman et al. | 358/496 |
| 5,438,364 | 8/1995 | Maeshima et al. | 348/223 |
| 5,453,798 | 9/1995 | White et al. | 348/692 |
| 5,495,361 | 2/1996 | Cresens | 358/509 |
| 5,596,427 | 1/1997 | Honma et al. | 358/515 |

Primary Examiner—Edward L. Coles
Assistant Examiner—Mark Wallerson
Attorney, Agent, or Firm—Oliff & Berridge, PLC

[57] ABSTRACT

A color image reading apparatus improves the reproducibility of colors at the black level end of the brightness scale of each of component color images of an original medium. The color image reading apparatus includes an illuminating unit that illuminates the original medium such as a film original, an imaging device that forms images of the original medium based on three component colors of red, green and blue and outputs a red color signal, a green color signal and a blue color signal, a gain controlled amplifying device that amplifies each of the component color signals output from the imaging device and a gain setting device that sets a common, adjustable gain for each of the component color signals using the single amplifying device.

27 Claims, 7 Drawing Sheets

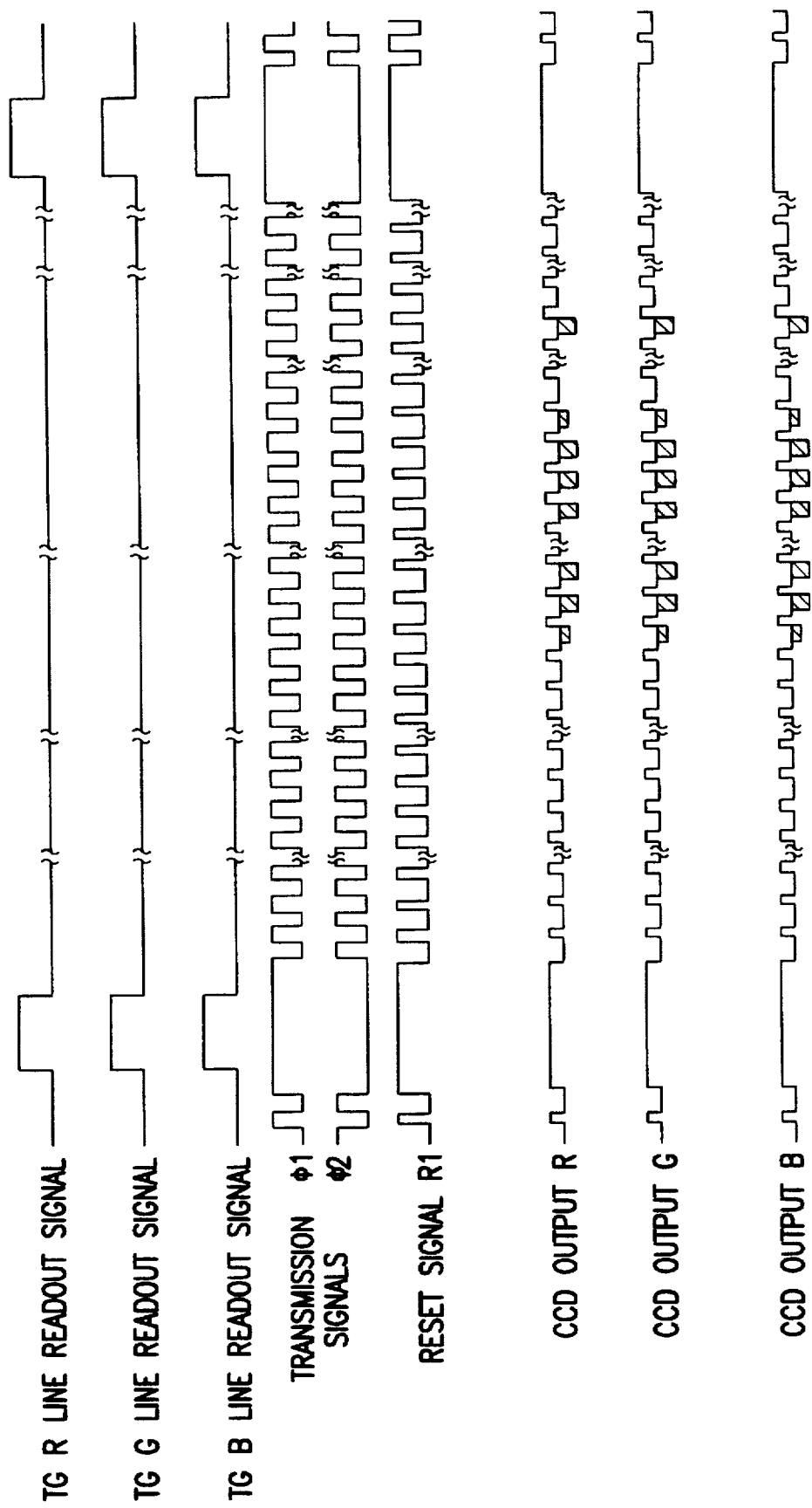

COLOR IMAGE READING APPARATUS AND METHOD

BACKGROUND OF THE INVENTION

1. Field of the Invention

The present invention relates to a color image reading apparatus and method.

2. Description of Related Art

In a conventional image reading apparatus, red color signals, green color signals and blue color signals output from an imaging device, such as a Charged Coupled Device (CCD), are separately amplified using three amplifiers (amps) having differing gains.

When attempting to obtain a high quality image, with conventional image reading apparatus, a problem arises due to the variances in the offset amount of black levels for the various component colors (e.g., red, green and blue), which results from the use of the three amps to separately amplify the red, green and blue color signals. Because the gains of the amps in the conventional image reading apparatus differ, the offset amounts of the amps also differ. Accordingly, because the black level output of the CCD is small, significant variances are created in the reproducibility of colors on the black level end of the brightness scale (i.e., darker colors) due to such differences in the offset amounts of the plural amps.

SUMMARY OF THE INVENTION

It is an object of the present invention to solve at least the above-described problems of conventional image reading apparatus.

It is another object of the present invention to provide a color image reading apparatus that can improve the reproducibility of colors at the black level end of the brightness scale.

It is yet another object to provide a color image reading apparatus and method that uses a single adjustable gain in a common amplifier for all component color signals.

In order to achieve the above and other objects, and to address the shortcomings in the prior art, a color image reading apparatus and method according to embodiments of the invention includes an amplifying circuit (or an amplifier) that uses a gain that is common to all of the component color signals to amplify the component color signals (which can be, for example, red color signals, green color signals and blue color signals) output from an imaging device such as a CCD or the like. The single gain for the amplifier common to the component color signals can be precisely set, for example, by using one data conversion table. The image reading apparatus can also include a time varying device for setting an individual integral time for each of the component color signals.

According to one embodiment, the common amplifier gain is set based on an absolute light amount ratio for the component color signals and a prescan.

According to another embodiment, the common amplifier gain is set based on the absolute light amount ratio for the component color signals and a degree of density designation.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described in conjunction with the following drawings in which like reference numerals refer to like elements and wherein:

FIG. 8 is a waveform diagram for the CCD control signals and CCD output for the image reading apparatus of FIG. 7.

DETAILED DESCRIPTION OF PREFERRED EMBODIMENTS

Figure 1:
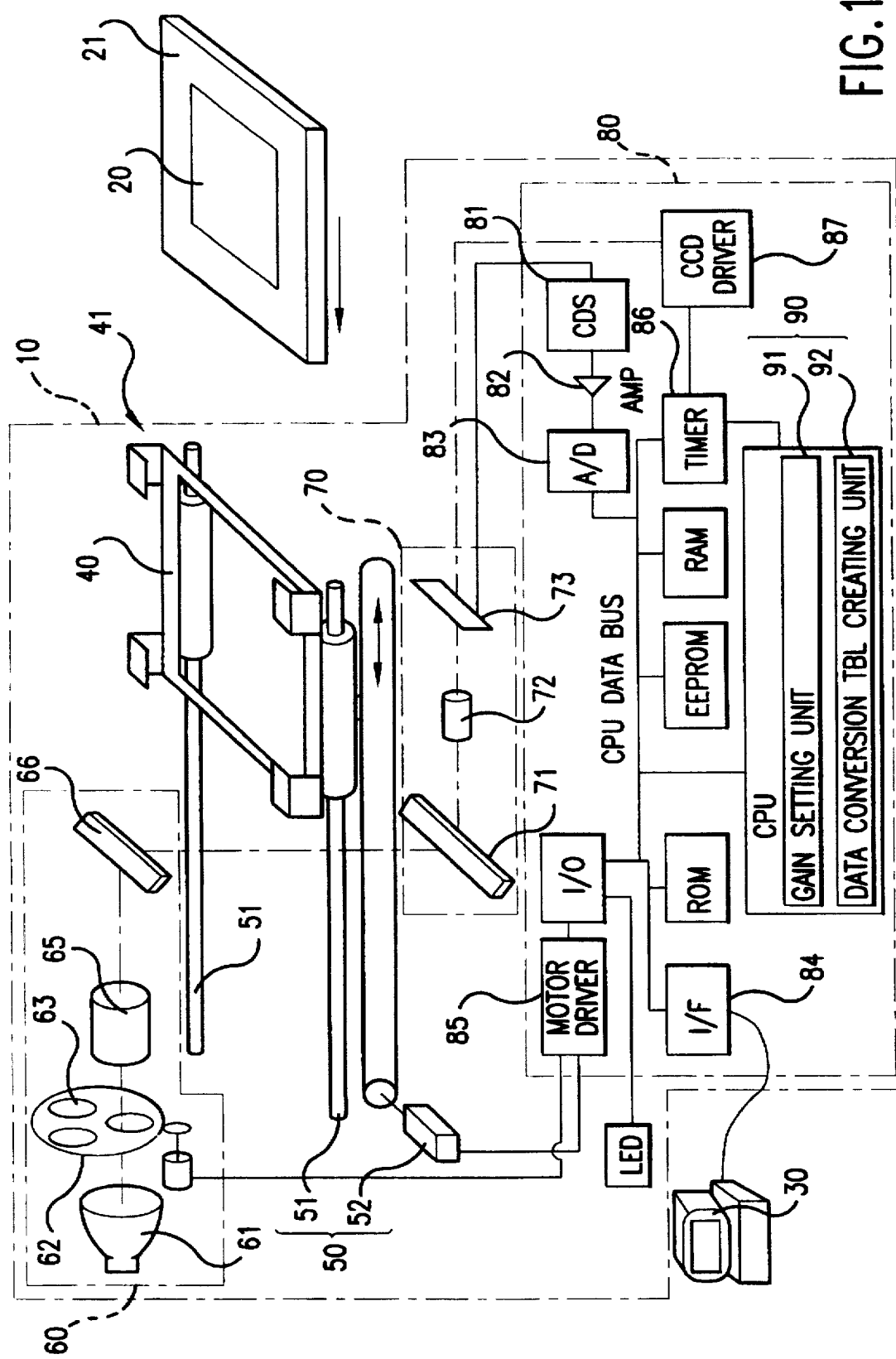
FIG. 1 is a schematic diagram of an image reading apparatus according to the present invention.

FIGS. 1–5 show a first preferred embodiment of a color image reading apparatus according to the invention. In the first embodiment, a color image is formed from three component color images, e.g., a red image, a green image and a blue image.

An image reading apparatus 10 includes a color scanner or the like that reads an original 20. The original 20 can be a film original medium or the like. In the FIG. 1 embodiment, the original 20 is a transparent original medium. Alternatively, the original 20 could be a non-transparent original medium such as a photograph or the like. In such a case, the light source would be arranged to reflect light from the non-transparent original and onto the imaging (CCD) device. The original 20 is held in an original medium holder 21 having the shape of a frame, as shown in FIG. 1.

A computer 30 (for example, a host computer) is electrically connected to the image reading apparatus 10 and functions as a control device thereof. The computer 30 includes, for example, a computer main body, a keyboard and a display, or the like. Reading by the image reading apparatus 10 is started through commands from the computer 30. Subsequently, the image data read from the original 20 is sent to the computer 30.

The image reading apparatus 10 can include a carriage 40 having an insertion opening 41 where the original medium holder 21 is inserted, a carrying unit 50 that carries the carriage 40 into the image reading apparatus 10, and an illumination unit 60 that illuminates the original 20 in the original medium holder 21 carried by the carrying unit 50. The illumination unit 60 illuminates the original 20 using three colors including red (hereafter R), green (hereafter G) and blue (hereafter B). An image reading unit 70 reads the original 20 illuminated by the illumination unit 60 and outputs color image signals including red signals (hereafter R signals), green signals (hereafter G signals) and blue signals (hereafter B signals). The image reading apparatus 10 further includes a control unit 80 to control at least the carrying unit 50 and the image reading unit 70.

As shown in FIG. 1, the carrying unit 50 includes a drive motor 52 and a pair of guide bars 51 having a left guide bar and a right guide bar that slidingly hold the carriage 40. The drive motor 52 moves the carriage 40 along the two guide bars 51. The drive motor 52 can be, for example, a stepper motor or the like.

The illumination unit 60 functions as an illuminating device in the apparatus 10. The illumination unit 60 includes a light source 61 that emits light parallel to a sliding direction of the carriage 40 and three color filters 63 for the colors RGB that are held in a color filter palette 62 to resolve light emitted from the light source 61 into the three colors RGB. A color switching motor 64 switches the color filters 63 for the three colors RGB by rotating the color filter palette 62. The illumination unit 60 further includes an illumination lens 65 that collects the light that has passed through the color filters 63 and a first mirror 66 that bends the light emitted from the illumination lens 65 to a direction perpendicular to the original 20 being carried in the carrying unit 50.

The image reading unit 70 includes a second mirror 71 that bends the light passed through the original 20 at a right angle below the original 20, an imaging lens 72 that forms the light from the second mirror 71 into an image and a linear CCD 73 that receives the imaged light from the imaging lens 72. The linear CCD 73 performs photoelectric conversion and outputs a color image signal corresponding to the image of the original 20.

As shown in FIG. 1, the linear CCD 73 acts as the imaging device; however, a two-dimensional imaging device can also be used. The illustrated image reading apparatus provides light having the three colors RGB from the illumination unit 60; however, a color CCD including mounted RGB color filters can also be used as the linear CCD 73. Thus, a color separating device that separates a plurality of color images in the three RGB colors from an original medium is positioned before the imaging device. Additionally, and as should be apparent from the alternatives discussed above, the arrangement of components relative to each other could be different from the arrangement illustrated in FIG. 1.

The control unit 80 includes a CPU 90, an internal memory group such as ROM, EEPROM and RAM or the like, and a CPU data bus electrically connecting at least the CPU 90 and the internal memory group. In addition to the internal memory, the image reading apparatus 10 can be connected to an external memory such as a magneto-optical (MO) disk drive or a hard disk.

As shown in FIG. 1, the control unit 80 further includes an amplifying device (e.g., an amplifier) 82 that amplifies the color image signals and is capable of having its gain set. The amp 82 receives the color image signals output from the CCD 73 through a Correlation Double Sampling (CDS) circuit 81. An A/D converter 83 receives the output from the amp 82 and converts the analog signal amplified by the amp 82 into a digital signal, which the A/D converter 83 outputs to a CPU data bus. An interface 84 of the control unit 80 outputs the digital signal converted by the A/D converter 83 to the computer 30 using the CPU data bus.

Alternatively, the digital signal can be output to the computer 30 directly from the A/D converter 83, rather than using the interface 84, or can be output after being stored in the RAM of the internal memory group, or the like.

Figure 5:
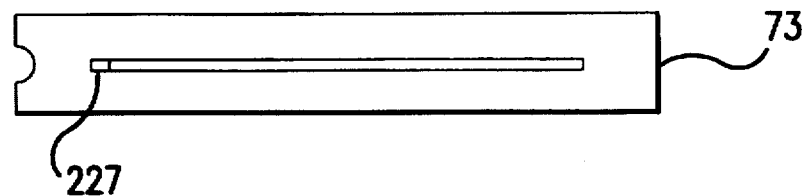
FIG. 5 is a block diagram showing a CCD.

The CCD 73 converts the received imaged light into an analog picture image signal. The CCD 73 includes a photosensor and a transmitter. The photosensor accumulates an electric load corresponding to the light received. The transmitter transmits the electric load accumulated in the photosensor to an external component of the CCD 73. One composition of the CCD 73 is shown in FIG. 5. A light shield mask 227 is attached to a part of CCD 73. The light shield mask 227 prevents light from reaching selected parts of the photosensor.

Figure 3:
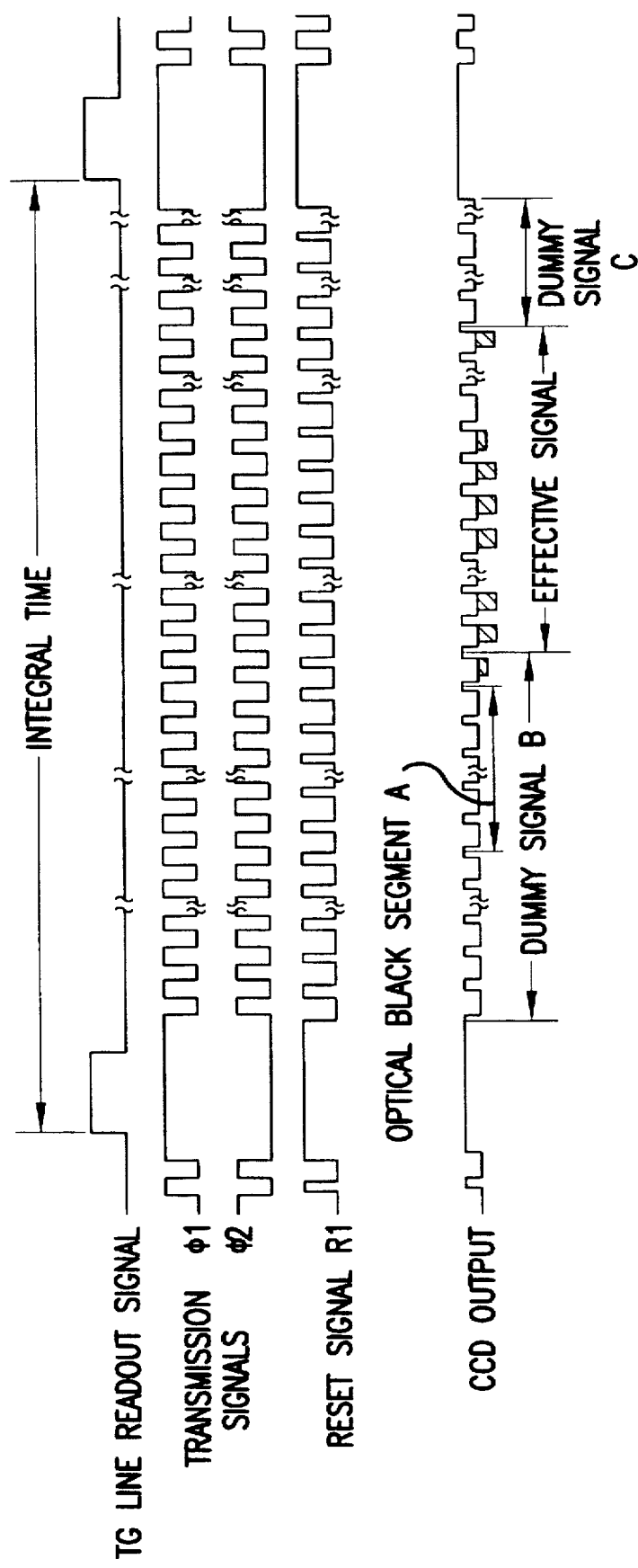
FIG. 3 is a waveform diagram for the CCD control signals and the CCD output.

A CCD driver 87 outputs a control signal that drives the CCD 73. The CCD driver 87 can be a circuit, a dedicated part of the control unit 80 or the like. The control signal includes a line readout signal TG, a transmission signal $\phi 1$, a transmission signal $\phi 2$ and a reset signal R1, as shown in FIG. 3. Each of these control signals are output to the CCD 73 from the CCD driver 87 through a signal line or the like.

The CCD 73 commences to newly accumulate the electric load in the photosensor at the same time as transmitting the previous electric load of the photosensor to the transmitter. The time (gap) between the beginning of a decline of the line readout signal TG and the beginning of the next incline is an integral time as shown in FIG. 3. The photosensor accumulates the electric load only during the integral time. If the integral time becomes longer, than the output of the CCD 73 increases. The CCD output is proportional to the integral time. Thus, if the integral time is doubled, then the output is also doubled.

During the integral time while the photosensor of the CCD 73 accumulates the electric load, the transmitter transmits the accumulated electric load of the photosensor from the previous integral time. The transmitter transmits the accumulated electric load in a chronological batch relay format using the changed state (the electric potential change) of the transmission signals $\phi 1$, $\phi 2$ and the reset signal R1.

The CCD output is a signal that is output to the external components from the transmitter of the CCD 73. The CCD output is synchronized with the reset signal R1, as shown in FIG. 3. With the CCD output, first a dummy signal B is output from the CCD 73. Within the dummy signal B, an optical black signal A determines the optical black level. The optical black signal A corresponds to a component of the CCD output of FIG. 3 determined using the light shield mask of the photosensor shown in FIG. 5. In other words, the component part that is the optical black signal A is the signal output when the light to the photosensor is completely shielded. Based upon the optical black signal A, the CPU 90 determines a black signal level offset. The offset of the black level determination is described hereafter.

An effective signal component, as shown in FIG. 3, is an analog picture image signal that corresponds to the effective pixels of the photosensor. Only the effective pixels of the photosensor are output from the CCD 73. Following the output of the effective signal component of the CCD output, the CCD 73 generates a dummy signal C until the end of the integral time. The analog picture image signals output from CCD 73 are input into the A/D converter 83 through the CDS 81 and the amp 82. The A/D converter 83 converts each analog picture image signal into a digital signal.

A timer 86 is synchronized with an interval signal to the CCD driver 87, and the analog picture image signal input into the A/D converter 83 is output. The digital signal output from the A/D converter 83 is stored once into RAM. The CPU 90 detects the level of the data of the optical black signal A through the digital signal, which indicates the address of the RAM. In the same manner, the CPU 90 detects the level of the effective pixels signal.

Figure 2:
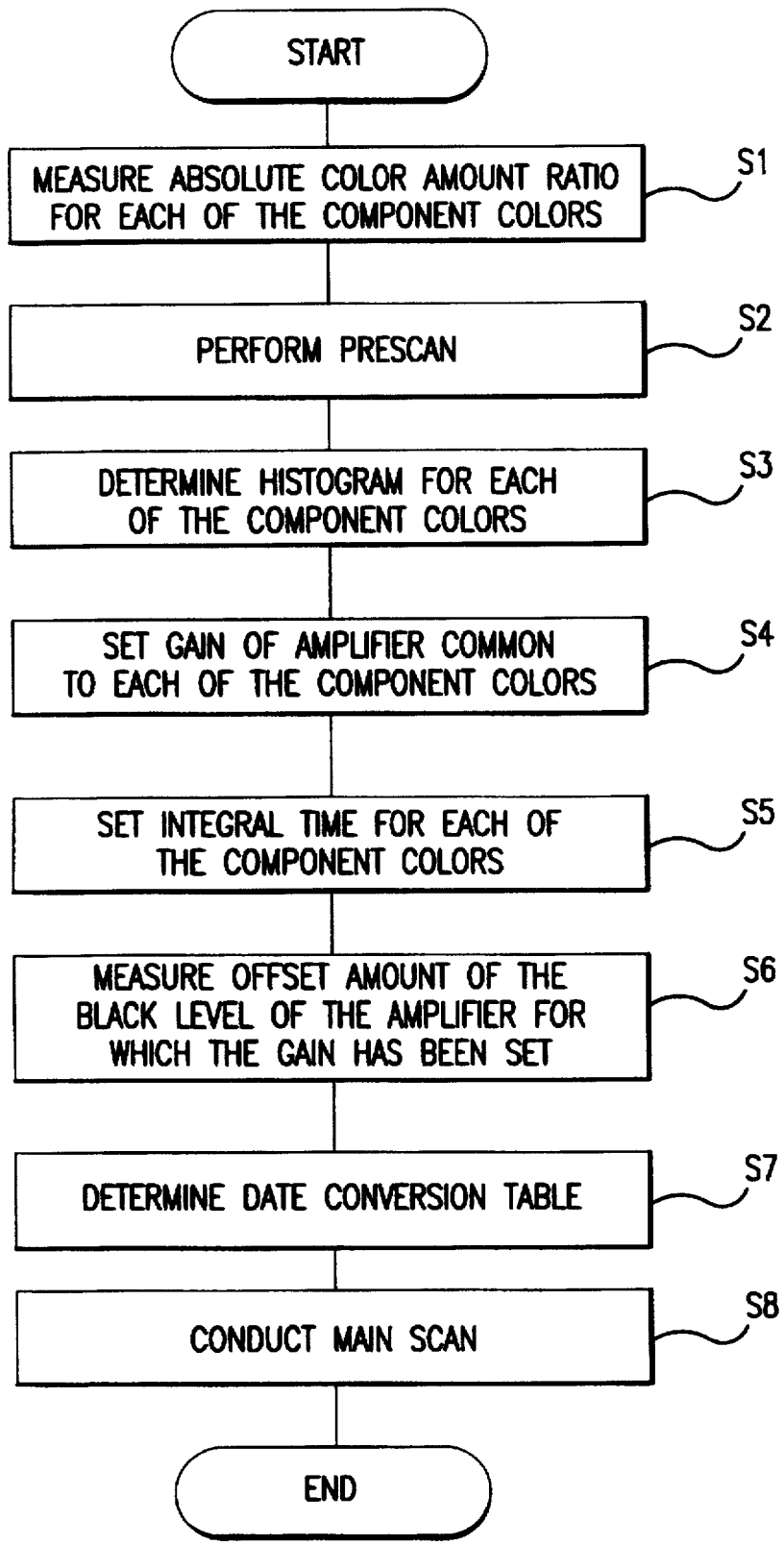
FIG. 2 is a flow chart of an image reading sequence according to one embodiment of the present invention.

Next, the operations of the first preferred embodiment of the image reading apparatus 10 equipped with the above-described structures will be described. Based on commands from the computer 30, the image reading apparatus 10 first performs a prescan. After the prescan is completed, the image reading apparatus 10 starts a main scan, as shown in FIG. 2. Each scan mode can be designated by an external switch (not shown) on the image reading apparatus 10.

Upon receipt of a prescan command from the computer 30, the image reading apparatus 10 first performs step S1, as shown in FIG. 2, where measurement of the absolute light amount ratio of the three colors RGB of the light source 61 is conducted. Step S1 can be performed, for example, by having the light emitted from the light source 61 directly read by the CCD 73. This can be performed as follows. Under instructions from the CPU 90, the motor driver 85 drives the driving motor 52 so that the original medium holder 21 mounted on the carriage 40 is conveyed temporarily to a position where the illuminating light from the light source 61 can be directly read by CCD 73. For example, the original medium holder 21 can be conveyed to an eject position as shown in FIG. 1.

Similarly, under instructions from the CPU 90, the motor driver 85 drives the color switching motor 64 so that an initial color filter 63, for example, the R filter, on the color filter palette 62 is aligned with the light source 61. At this time, the light source 61 also is activated.

As a result, the R light having passed through the R filter is directly emitted to and received by the CCD 73 through the illumination lens 65, the first mirror 66, the second mirror 71 and the imaging lens 72, respectively.

As shown in FIG. 1, the CPU 90 drives the CCD driver 87 with the timing given by a timer 86, and the R signal of a first line is read by the CCD 73. The R signal that has been read is output to the CDS circuit 81 and is digitized by the A/D converter 83 after passing through the amp 82. The digitized R signal is output to the CPU 90 through the CPU data bus and also is stored in the internal memory group. After the R signal reading has been completed, the G signal and the B signal are similarly read in succession, and are also stored in the internal memory group.

Each of the RGB signals then is read from the internal memory group, and the output level ratio of the RGB signals, i.e. the absolute light amount ratio of each of the colors RGB in the light source 61, is determined. The determination is conducted by a gain setting unit 91 in the CPU 90, as shown in FIG. 1. The gain setting unit 91 can be part of a general purpose computer programmed to determine the gain or a dedicated logic circuit, for example.

Upon completion of step S1, program control continues to step S2 where a prescan is executed, as shown in FIG. 2. In step S2, the driving motor 52 is driven under instructions from the CPU 90 to convey the original 20 in the original medium holder 21 that is mounted on the carriage 40 to a predetermined reading position. Next, the R signal is read (similar to step S1) in a conventional manner while the original 20 is moved in an auxiliary (or secondary) scanning direction through operation of the driving motor 52. After the R signal reading has been completed, the G signal and the B signal are similarly read in succession. In the prescan, the RGB signals for each line of the original 20 can be read by rotating the color filter palette 62 for each line.

Upon completion of step S2, program control continues to step S3, where a histogram of each of the RGB signals read by the prescan is created. The manners by which a histogram can be created are well known in the art and, therefore, are not discussed in any further detail herein. The histogram is created by the gain setting unit 91 in the CPU 90. The histogram can also be created by the CPU 90 using the prescan RGB signals stored in the internal memory group.

Upon completion of the third step S3, program control continues to step S4, where a gain to be used for the amp 82, which is common for the RGB signals, is set. The gain is set based on the absolute light amount ratio of each of the RGB colors and the histogram of the RGB signals as detailed below. The setting of the gain of the amp 82 is performed by the gain setting unit 91 in the CPU 90. The setting of the common amp 82 gain also can be performed by the CPU 90 based on RGB data stored in the internal memory group.

One example by which the common gain is set will now be described. As will be detailed below, once the common gain is set, additional parameters are set including the integral time and the data conversion table.

First, the digital signal output of the absolute light amount ratio of each of the colors RGB is converted so that it becomes R:G:B=1:1:1. This is performed based on the measurement of the absolute amount of light ratio determined in step Si. As a first example, assume that the absolute light amount ratio of R:G:B measured in step S1 (in which light emitted by the light source is directly measured) is R:G:B=50:100:40. The output of the R signal should be amplified by 100/50 and the output of the B signal should be amplified by 100/40. If amplified by these amounts, the RGB digital signal output becomes R:G:B=1:1:1. In step S1, if the integral time that measured the absolute amount of light is T1, then T1 becomes the minimum integral time obtained by the device, which is the image reading apparatus 10. Thus, because R, G, B have the same output as discussed above, the CPU 90 appropriately sets R to (100/50) * T1; and G as T1; and B as (100/40) * T1.

In step S2, the minimum integral time is established by CPU 90, and a prescan is executed. As discussed above in step S3, a histogram of each of the digital signals R, G and B is also made based on the prescan of step S2, and the maximum value is obtained for each of the RGB digital signals from the histogram of each of the RGB digital signals. Continuing the above first example, assume that the output values of the RGB signals obtained in the prescan (as a result of performing steps S2 and S3) are R:G:B= 200:210:180. With the above values, the greatest value is that of the G digital signal, which is 210. Using a data conversion table such as a look-up table (LUT) explained hereafter, preferably the digital signals are processed using a full range of 8 bits. When these RGB signals are expressed by 8 bit data, the expressible values are in the range from 0 to 255, with 255 being the maximum value. Since the RGB signal having the largest output value is the 210 of the G signal, the 210 of the G signal is advantageously converted to the maximum expressible value 255 of the 8 bit data. In other words, the G signal is increased by a factor of 255/210. Similarly, the R and B signals are amplified by a factor of 255/210 in coordination with the G digital signal. Thus, 255/210 is referred to as the conversion ratio.

In step S4, a gain of the common amp 82 is set for the colors RGB. Initially, however, the CPU 90 calculates a target amplification ratio for each of the colors RGB. The target amplification ratio is relative to the initial time period established in step S1. The CPU 90 calculates the target amplification ratio based on the integral time established for each of the colors RGB determined from step S2 and the conversion ratio values determined from performing step S3.

In accordance with the above example, it is determined that the target amplification ratio of the R signal is approximately (100/50)×(255/210)=(100×255)/(50×210)=2.43. The target amplification ratio of the G signal is approximately 255/210=1.21. The target amplification ratio of the B signal is approximately (100/40)×(255/210)=(100×255)/40×210)= 3.04.

In step S4, the gain of the common amp 82 is then set based on the lowest target amplification ratio. In the first embodiment, the possible values that can be set for the gain of the amp 82 are the values of 1-fold, 2-fold, 3-fold and 4-fold. The gain setting unit 91 determines the lowest value of the target amplification ratios. In the above example, the gain of the amp 82 is preferably set to 1-fold by the gain setting unit 91, which is closest to the lowest (G signal=1.21) target amplification ratio.

Thus, a common gain is set in the amp 82 for all the color signals. Initially, however, the gain setting unit 91 determines whether a target gain ratio n exists using Equation 1 as follows:

$$n \leq \text{lowest target amplification ratio} < n+1 \quad (1)$$

The target gain ratio n is compared to the possible values that can be set for the amp 82. In the above example, because the possible values for the gain of the amp 82 are (1,2,3,4) and the lowest target amplification ratio is 1.21, then Equation (1) is satisfied when n=1. ($1 \leq 1.21 < 1+1$). When the target gain ratio n exists, then the gain (1 in the above example) is set as the gain of the amp 82 that is used for each of the colors RGB. If there is no target gain ratio n that satisfies Equation (1), then the closest value, generally the maximum value that can be set for the common amp 82, is determined to be the gain for each of the colors RGB.

In order to compensate for the use of a single amplifier gain with all three color signals, additional parameters should be set. Accordingly, after setting of the gain of the amp 82 in step S4, program control continues to step S5, where an integral time for each of the RGB signals is set by the CPU 90. Thus, in step S5, a deficiency in the gain of the amp 82 is accommodated by adjusting the integral time for each of the RGB signals. In other words, the integral time of the RGB signals is determined in order to offset for the gain of the single adjustable amp 82.

In step S5, the integral time can be determined using Equation (2) as follows:

$$\text{Integral time} = (\text{component color RGB target amplification ratio} / \text{common gain}) * T1 \quad (2)$$

In accordance with the above example and using Equation (2), an integral time T2(R) of the R signal is approximately T2 (R)=(2.43/1) * T1. An integral time T2(G) of the G signal is approximately T2 (G)=(1.21/1) * T1. An integral time T2(B) of the B signal is approximately T2 (B)=(3.04/1) * T1. The adjustment of the integral times is accomplished by adjusting the spacing of the pulses of a trans gate (TG) pulse. The TG pulse is a pulse that is used to read the linear CCD 73 signals, an example of which is shown in FIG. 3. The integral time of the CCD 73 can be controlled by the CPU 90 using a control program or the like to drive the timer 86.

Based on the CPU 90 control, the timer 86 outputs the interval signal through the CCD driver 87. With the line readout signal TG being output to the CCD 73 based on the interval signal from the timer 86 as described above, the integral time of the CCD 73 can be changed, for example, for the colors R, G, and B, respectively. In the example detailed above, the gain of amp 82 was set to 1-fold. Accordingly, the amplification of each of the RGB signals is adjusted over the entire integral time.

After the integral time is set in step S5, program control continues to step S6. In step S6, an offset value of a black level of the amp 82 for which the gain has been set is determined. In this embodiment, the black level offset value is determined by the CPU 90. In the present example, the black level offset output is obtained optically using an optical black level signal A of the CCD 73, as indicated by the CCD output in FIG. 3. Initially in step S6, the shortest component color is selected from among the integral times established in step S5. In the above example, the shortest integral time is for the G signal. Next, the illumination unit 60 is controlled to illuminate the selected color G, the CCD driver 87 is driven, and the G analog picture image signal is output to the CCD 73. Based on the optical black signal A thus obtained in the CCD output for the selected color G, the CPU 90 measures the offset value of the black level. For imaging devices such as a CCD where the black level signal is not optically output, a black level offset value can be measured based on a dummy signal.

Figure 4:
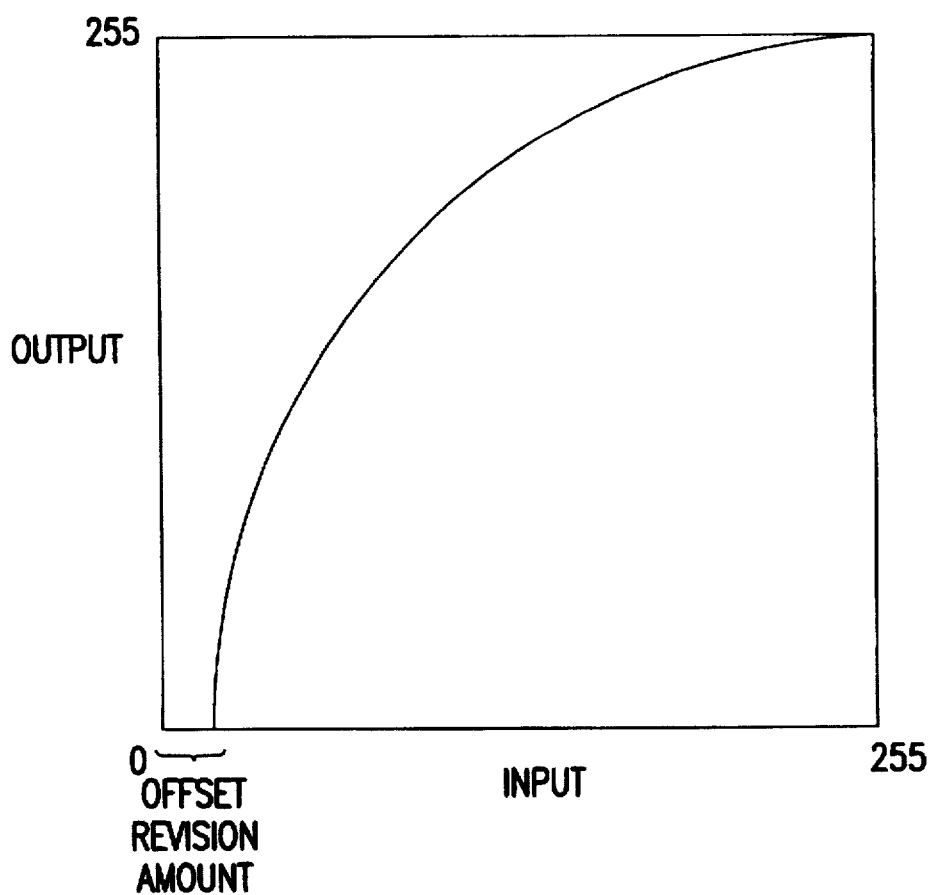
FIG. 4 illustrates a data conversion table generated in accordance with one embodiment of the invention.

After the offset value is determined in step S6, program control continues to step S7, as shown in FIG. 2. In step S7, a data conversion table such as the look-up table (LUT) is determined. Initially, a data conversion table creating unit 92 calculates the offset correction amount based on the offset value of step S6. As shown in FIG. 4, the data conversion table creating unit 92 then determines the LUT that is shifted only by the amount of the offset correction amount. The LUT is a compilation where the data conversion table creating unit 92 combines the specified nonlinear conversion table and the offset correction amount.

The data conversion table creating unit 92 in the CPU 90 (FIG. 1) creates the data conversion table. The data conversion table can also be determined by the CPU 90 based on the data stored in the internal memory group. The data conversion table creating unit 92 can be part of a general purpose computer programmed to determine the gain, or a dedicated logic circuit, for example.

Upon completion of the data conversion table in step S7, program control continues to step S8, as shown in FIG. 2, where under control of the host computer 30, the image reading apparatus 10 conducts the main scan. During the main scan, the CPU 90 drives the CCD driver 87, and by using the integral time established in step S5, the analog picture image signal for each of the colors RGB is obtained. In addition, the amp 82 amplifies the analog picture image signal by the common gain determined in step S4 for each of the colors RGB. Further, the digital signal converted by the A/D converter 83 is conversion processed by the CPU 90 through the LUT determined in step S7. Thus, the picture image signal for each of the broken out colors RGB are amplified by a single gain and conversion processed by the same LUT. Therefore, on the black level side, the reproduction of the colors improves. Further, variations in the absolute light amount ratio between the colors RGB can be corrected by setting the integral time of the CCD. Thus, there is good color reproduction on the black level side. In addition, because the color image reading device composition is simple, the device is low in cost.

Figure 6:
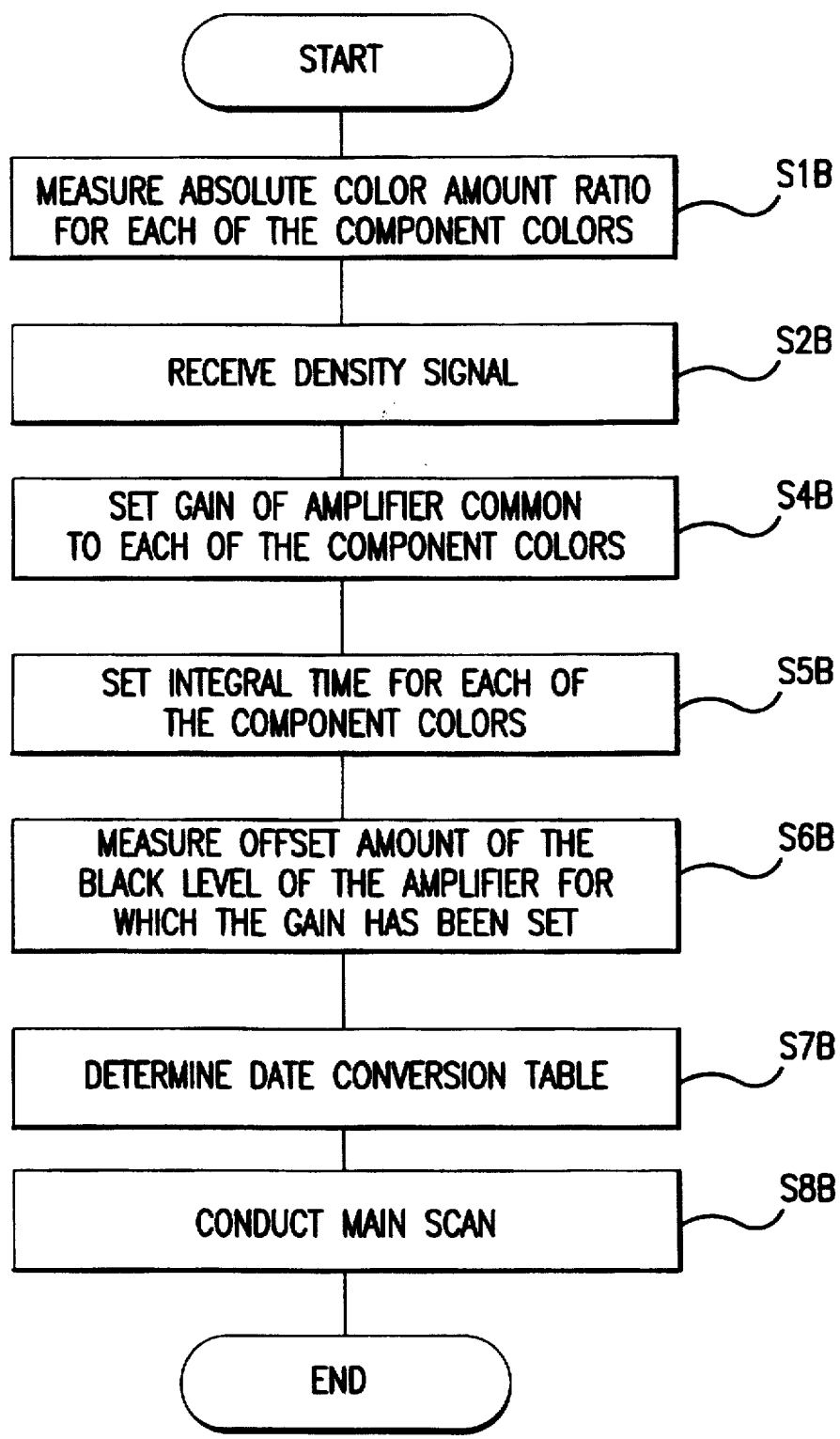
FIG. 6 is a flow chart of an image reading sequence according to another embodiment of the present invention.

In the first embodiment, a prescan is used to set the gain of amp 82. However, the invention is not limited to the use of the prescan. In a second embodiment, when there is a density designation from the computer 30, it is possible to set the gain of amp 82 without performing the prescan. The CPU 90 control of the second embodiment is shown in FIG. 6. Because the CPU 90 control is similar to the first embodiment, a detailed explanation of only the differing features is provided below.

Next, a sequence of operations of the image reading apparatus 10 according to the second embodiment will be described with respect to FIG. 6. Upon receipt of a start command, the image reading apparatus 10 program control moves to step S1B. In step S1B, the absolute amount of light ratio is measured.

As a second example, assume the absolute light amount ratio R,G,B, is measured at R:G:B=50:100:40. In such a situation, the integral time of the CCD 73 during measurement of the RGB absolute light amount is set to a predetermined value, for example, the minimum value T1 of the particular color image reading apparatus. In accordance with the second example above, assume that the CCD output of the G signal from the CCD 73 is 80. In other words, assume that the output of the CCD 73 using the integral time minimum value T1 is 80 for the integral time where the output of the density 0 (a state without interference). Then, the G signal can be converted to the maximum value 255 expressed by 8 bit data using the amplification factor 255/80.

Then, program control continues to step S2B. In step S2B, a degree of density data is input from the host computer 30. To continue the second example above, assume the degree of density data is input as 0.3.

The digital signal output of each of RGB is then converted so as to become R:G:B=1:1:1. Thus, according to the second example above, an R integral time becomes T3 (R)=10^0.3* (255/80)*T1*(100/50)=12.8 T1. A G integral time becomes T3 (G)=10^0.3*(255/80)*T1=6.4 T1. A B integral time becomes T3 (B)=10^0.3*(255/80)*T1 times (100/40)=15.9 T1.

In the first embodiment, the amp gain in step S4 was set to 1. In the same manner for the second example above, a gain of 4 is set for the amp 82. Thus, the second embodiment sets the gain of the common amp 82 in step S4B, determines the integral times in step S5B, measures the black level offset amount of the amp 82 in step S6B, determines the data conversion table in step S7B and conducts the main scan in step S8B.

Using the above sequence of operations, the integral time used to obtain a balance among each of the colors RGB and the density designation can be determined. Therefore, the amp 82 gain can be set without conducting the prescan. In other words, steps S2 and S3 as shown in FIG. 2 can be omitted.

The amount of addition to the dark current of the CCD 73 differs depending on the color RGB because the integral time of each of the colors RGB differs, but improvements in recent devices are such that it is possible to ignore additions to the dark current. This has a lesser effect on image quality than the prior art which amplified the various dark levels by different amounts.

The sequential illumination of the original medium 20 is performed by the three color illumination of R,G,B as described above. The color image reading apparatus and operations thus break out the object image into the three colors R,G,B. However, the color breakdown can be performed by other methods.

Figure 7:
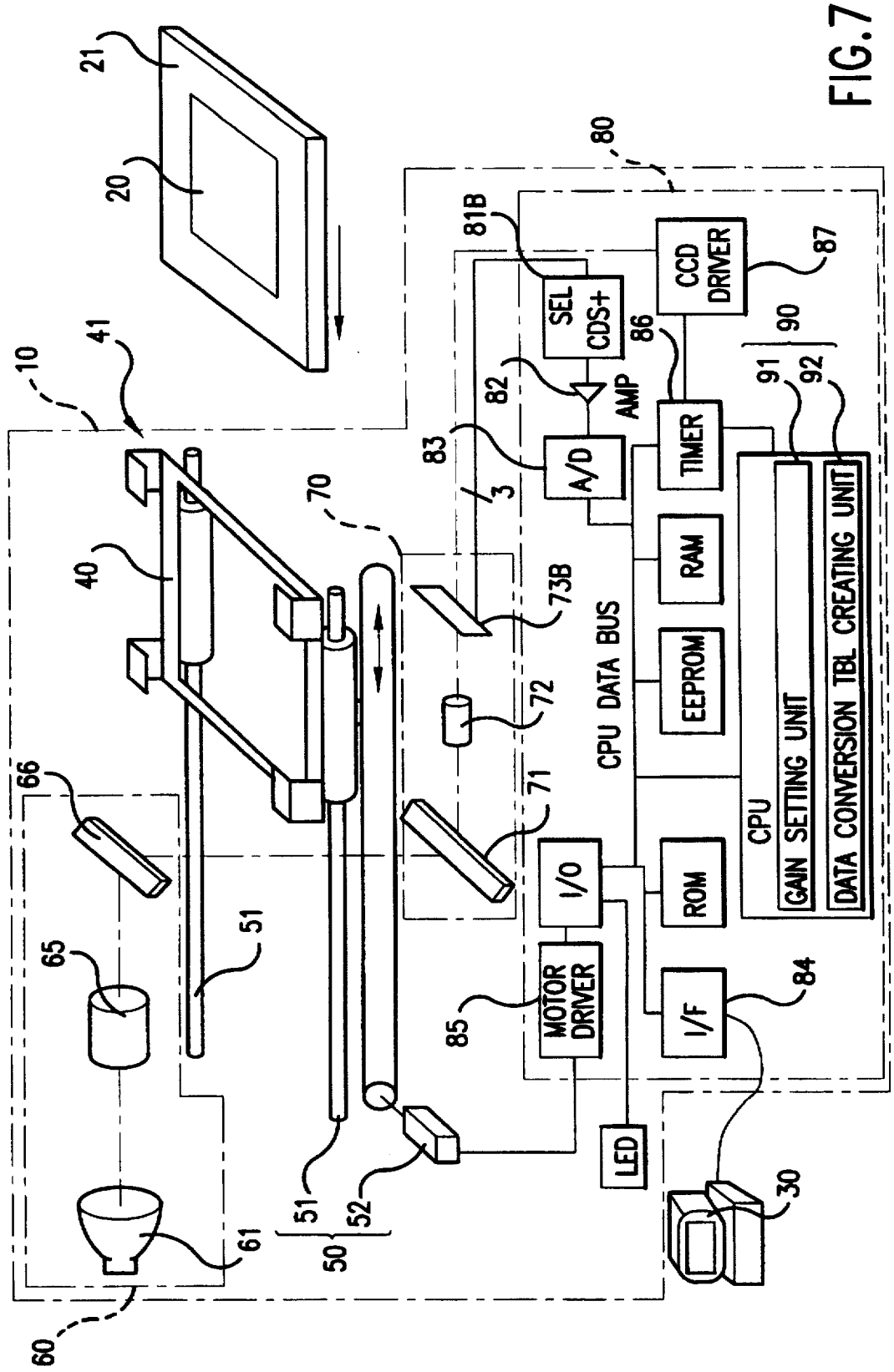
FIG. 7 is a schematic diagram of an image reading apparatus according to yet another embodiment of the present invention.

A color image reading apparatus according to a third preferred embodiment uses a three line color sensor. A color image reading apparatus block diagram using the three color sensor is shown in FIG. 7. In addition, the control signals output for each of the signals of the three color sensors are shown in FIG. 8.

A three line color sensor CCD 73B is a photoelectric conversion element. The three color sensor CCD 73B has three rows of photosensors. To each of the rows are affixed RGB filters (hereafter referred to respectively as the R row, G row, and the B row). In other words, the function of the color filter palette 62 of FIG. 1 is included in the CCD 73B.

The CCD driver 87 independently outputs the line readout signal pulses TG R, TG G, and TG B to each of the R row, G row, and B row, respectively, of the three color sensor CCD 73B as shown in FIG. 8. In this manner, the CCD output R, the CCD output G, and the CCD output B, are made independent, and are output from the three line color sensor 73B. In other words, the CCD driver 87 can be driven by the individual integral times of the R row, the G row, and the B row. The three CCD outputs of the R row, the G row, and the B row are appropriately provided to the amp 82 through a select function of a CDS 81B. The earlier described sequence of operations can similarly be performed by the one of ordinary skill in the art using color imaging device having the three line color sensor CCD 73B.

The image reading apparatus described above operates by setting a common gain for the R signal, the G signal and the B blue color signal. Then, the RGB signals output from the imaging device can be amplified by the common gain of the amplifying device. Thus, the gain of each of the color signals are common and the reproducibility of the black level color, which has a low output level from the imaging device, can be improved.

With the preferred embodiments of the present invention, a color image reading apparatus is provided having improved reproducibility of the colors on the black level end of the brightness scale. The improved image reading apparatus amplifies the component color signals (e.g., the red color signal, the green color signal and the blue color signal) output from the imaging device using a common amplifying circuit having a single adjustable gain. The single gain that is common to the signals of the component colors can be precisely set. It is possible to use a single data conversion table because the color image reading apparatus can use a single amplifier and a single gain.

While this invention has been described in conjunction with specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A scanning device for scanning original media, comprising:

illuminating means for radiating a light onto an original medium;

color separating means for separating a plurality of color component images from an image of said original medium by using said light;

image reading means for reading said plurality of color component images and outputting a plurality of color component image signals;

carrying means for relatively moving said original medium and said image reading means;

amplifying means for amplifying all of said plurality of color component image signals output from said image reading means by using a single adjustable gain during a period in which said image reading means is reading said plurality of color component images of said original medium;

gain setting means for setting a value of said single adjustable gain of said amplifying means such that all of said plurality of color component image signals are amplified using said single adjustable gain; and absolute light amount measuring means for measuring an absolute light amount ratio of the plurality of color component images;

wherein the gain setting means sets the value of the single, adjustable gain of the amplifying means based on the measured absolute light amount ratio.

2. The still image reading apparatus of claim 1, wherein said gain setting means sets said value of said single, adjustable gain based on said measured absolute light amount ratio and on a plurality of color component image signals output by said image reading means during a prescan operation.

3. The still image reading apparatus of claim 1, wherein said gain setting means sets said value of said single, adjustable gain based on said measured absolute light amount ratio and on a density designation for said plurality of color component image signals.

4. The still image reading apparatus of claim 1 further comprising:

offset amount measuring means for measuring an offset amount of a black level of one of the color component image signals output by the image reading means based on said value of said single, adjustable gain; and data conversion table creating means for creating a data conversion table that revises said offset amount of said black level measured by said offset amount measuring means.

5. The still image reading apparatus of claim 4, wherein said offset amount measuring means measures said offset amount of said black level based on an optical black level signal output by said image reading means.

6. The still image reading apparatus of claim 1 further comprising:

offset amount measuring means for measuring an offset amount of a black level of one of the color component image signals output by the image reading means based on said value of said single, adjustable gain; and data conversion table creating means for creating a data conversion table that revises said offset amount of said black level measured by said offset amount measuring means.

7. The still image reading apparatus of claim 1, wherein said color separating means includes a color filter positioned on a light receiving area of said image reading means.

8. The still image reading apparatus of claim 1, wherein said plurality of color component images includes at least three color images of red, green and blue.

9. The still image reading apparatus of claim 1, further comprising time varying means for varying an integral time used by said image reading means to receive illuminating light from the original medium in order to output said color component image signals, said time varying means setting an individual integral time for each of said color component image signals.

10. A method for operating a color scanning device for scanning original media comprising the steps of:

radiating a light onto an original medium;

forming a plurality of color component images from an image of said original medium by using said light;

reading said plurality of color component images by relatively moving said original medium and said light and outputting a plurality of color component image signals;

amplifying all of said plurality of color component image signals using a single adjustable gain during a period in which said plurality of color component images of said original medium are being read;

setting a value of said single adjustable gain such that all of said plurality of color component image signals are amplified using said single adjustable gain; and measuring an absolute light amount ratio of the plurality of color component images;

wherein the setting step sets the value of the single, adjustable gain based on the measured absolute light amount ratio.

11. The still method according to claim 10, further comprising performing a prescan operation that outputs a plurality of color component images, wherein said setting step sets said value of said single, adjustable gain based on said measured absolute light amount ratio and said plurality of color component image signals output during said prescan operation.

12. The still method according to claim 10, further comprising determining a density designation for said plurality of color component image signals, wherein said setting step sets said value of said single, adjustable gain based on said measured absolute light amount ratio and on said density designation for said plurality of color component image signals.

13. The still method according to claim 10, further comprising:

measuring an offset amount of a black level of one of the color component image signals based on said value of said single, adjustable gain; and creating a data conversion table that revises said offset amount of said black level.

14. The still method according to claim 13, wherein said offset amount measuring step measures said offset amount of said black level based on an optical black level signal output by an imaging device.

15. The still method according to claim 10, further comprising:

measuring an offset amount of a black level of one of the color component image signals based on said value of said single, adjustable gain; and creating a data conversion table that revises said offset amount of said black level.

16. The method according to claim 10, wherein said forming step includes positioning a color filter on a light receiving area of an image reading device.

17. The method according to claim 10, wherein said plurality of color component images includes at least three color images of red, green and blue.

18. The method according to claim 10, further comprising a time varying step that varies an individual integral time for each of said color component image signals.

19. A scanning device for scanning original media, comprising:

a light source that radiates light onto an original medium;

a color separating member that separates a plurality of color component images from an image of said original medium by using said light;

a photosensor device that reads said plurality of color component images and outputs the plurality of color component image signals;

a carrying unit that relatively moves said original medium and said photosensor device;

an amplifying circuit coupled to said photosensor device that amplifies all of said plurality of color component image signals output from said photosensor device by using a single adjustable gain during a period in which said photosensor device is reading said plurality of color component images of said original medium;

a gain setting device that sets a value of said single adjustable gain of said amplifying circuit such that all of said plurality of color component image signals are amplified using said single adjustable gain; and an absolute light amount measuring device that measures an absolute light amount ratio of the plurality of color component images;

wherein the gain setting device sets the value of the single, adjustable gain of the amplifying circuit based on the measured absolute light amount ratio.

20. The still image reading apparatus of claim 19, wherein said gain setting device sets said value of said single, adjustable gain based on said measured absolute light amount ratio and on a plurality of color component image signals output by said photosensor device during a prescan operation.

21. The still image reading apparatus of claim 19, wherein said gain setting device sets said value of said single, adjustable gain based on said measured absolute light amount ratio and on a density designation for each of said plurality of color component image signals.

22. The still image reading apparatus of claim 19 further comprising:

an offset amount measuring device that measures an offset amount of a black level of one of the color component image signals output by the photosensor device based on said value of said single, adjustable gain; and a data conversion table creating device that creates a data conversion table that revises said offset amount of said black level measured by said offset amount measuring device.

23. The still image reading apparatus of claim 22, wherein said offset amount measuring device measures said offset amount of said black level based on an optical black level signal output by said photosensor device.

24. The still image reading apparatus of claim 19 further comprising:

an offset amount measuring device that measures an offset amount of a black level of one of the color component image signals output by the photosensor device based on said value of said single, adjustable gain; and a data conversion table creating device that creates a data conversion table that revises said offset amount of said black level measured by said offset amount measuring device.

25. The still image reading apparatus of claim 19, wherein said color separating member includes a color filter positioned on a light receiving area of said photosensor device.

26. The still image reading apparatus of claim 19, wherein said plurality of color component images includes at least color images of red, green and blue.

27. The still image reading apparatus of claim 19, further comprising a time varying device that varies an integral time used by said photosensor device to receive illuminating light from the original medium in order to output said color component image signals, said time varying device setting an individual integral time for each of said color component image signals.

* * * * *